United States Patent
Chien et al.

(10) Patent No.: US 12,542,168 B2
(45) Date of Patent: Feb. 3, 2026

(54) DATA STORAGE DEVICE AND DATA PROTECTION METHOD THEREOF

(71) Applicant: Silicon Motion, Inc., Jhubei (TW)

(72) Inventors: Jieh-Hsin Chien, Taoyuan (TW); Yi-Hua Pao, Hsinchu (TW)

(73) Assignee: Silicon Motion, Inc., Jhubei (TW)

( * ) Notice: Subject to any disclaimer, the term of this patent is extended or adjusted under 35 U.S.C. 154(b) by 125 days.

(21) Appl. No.: 18/389,227

(22) Filed: Nov. 14, 2023

(65) Prior Publication Data
US 2024/0170036 A1   May 23, 2024

(30) Foreign Application Priority Data

Nov. 17, 2022   (TW) .................................. 111143970

(51) Int. Cl.
*G11C 11/406* (2006.01)
*G11C 11/4074* (2006.01)

(52) U.S. Cl.
CPC .... *G11C 11/40615* (2013.01); *G11C 11/4074* (2013.01)

(58) Field of Classification Search
CPC ........... G11C 11/40615; G11C 11/4074; G06F 3/0616; G06F 3/0646; G06F 3/0679; G06F 11/3037; G06F 11/3058

USPC ......................................................... 365/222
See application file for complete search history.

(56) References Cited

U.S. PATENT DOCUMENTS

| | | | |
|---|---|---|---|
| 2018/0335817 A1 | 11/2018 | Lin et al. | |
| 2021/0201986 A1* | 7/2021 | Brandl | G11C 11/40615 |
| 2021/0318831 A1 | 10/2021 | Wu et al. | |
| 2022/0083470 A1 | 3/2022 | Jeon et al. | |

* cited by examiner

*Primary Examiner* — Huan Hoang

(57) ABSTRACT

A data protection method applied to a data storage device including a volatile memory and a non-volatile flash memory is provided. The data protection method includes, executing a protection program after the data storage device is coupled to a host, to perform following steps: shielding a refresh command from the host; monitoring a working voltage of the data storage device through a voltage sensing module; determining whether the working voltage is lower than a threshold; when it is determined that the working voltage is lower than the threshold, providing the data storage device with power to trigger the refresh command to write the data in the volatile memory into the non-volatile flash memory. Therefore, the writing times of the data storage device are reduced, the performance degradation of the data storage device is avoided, and the service life of the data storage device is extended.

10 Claims, 1 Drawing Sheet

DATA STORAGE DEVICE AND DATA PROTECTION METHOD THEREOF

FIELD OF THE INVENTION

The invention relates to data protection technologies, and more particularly, to a data storage device and a data protection method thereof.

BACKGROUND OF THE INVENTION

A Flash memory is a common non-volatile data storage device written, erased and programmed electrically. Taking the NAND flash as an example, it is often used as a memory card, a USB flash device, a solid state hard disk (SSD), an embedded flash memory module (eMMC), and so on.

It should be noted that when the host (e.g., a host computer) is powered on, the non-volatile data storage device (such as the SSD) coupled to the host is also powered on. Meanwhile, the host frequently sends a flush command or a standby-immediately command in order to write data and the Host Logical-Flash Physical (H2F) look-up table in the volatile dynamic random access memory in the solid-state hard disk into the non-volatile flash memory in the solid-state hard disk, so as to avoid the loss of the data and the H2F look-up table in the volatile dynamic random access memory due to the instantaneous power failure or power off. However, such frequent writing will lead to an increase in the number of writing times of data storage devices (that is, an increase in WAI), degrade in the performance of data storage devices, and a shortening of the service life of data storage devices.

SUMMARY OF THE INVENTION

In view of the above, the present invention provides a data storage device and a data protection method thereof, which can effectively reduce the writing times of the data storage devices, avoid the performance degradation of the data storage devices, and prolong the service life of the data storage devices.

An embodiment of the present invention provides a data protection method applied to data storage devices comprising a volatile memory and a non-volatile flash memory. The data protection method comprises executing a protection program after the data storage device is coupled to a host to perform following steps: shielding a refresh command from the host; monitoring a working voltage of the data storage device through a voltage sensing module; determining whether the working voltage is lower than a threshold; and providing the data storage device with power to trigger the refresh command when it is determined that the working voltage is lower than the threshold, to write the data in the volatile memory into the non-volatile flash memory.

In an embodiment of the present invention, the data storage device comprises an internal power supply module, which is triggered to provide power to the data storage device when it is determined that the working voltage is lower than the threshold.

In an embodiment of the present invention, the internal power supply module is a capacitor.

In an embodiment of the present invention, when it is determined that the working voltage is lower than the threshold, an external power supply module is triggered to provide power to the data storage device.

An embodiment of the present invention provides a data storage device that comprises a volatile memory, a non-volatile flash memory, an internal power supply module and a controller. The internal power supply module is coupled to the volatile memory and the non-volatile flash memory. The controller is coupled to the volatile memory, the non-volatile flash memory and the internal power supply module. After the data storage device is coupled to a host, the controller executes a protection program to perform following steps: shielding a refresh command from the host; monitoring a working voltage of the data storage device through a voltage sensing module; determining whether the working voltage is lower than a threshold; and providing the data storage device with power when it is determined that the working voltage is lower than the threshold, in order to trigger the refresh command to write the data in the volatile memory into the non-volatile flash memory.

In an embodiment of the present invention, the internal power supply module is triggered to provide power to the data storage device when it is determined that the operating voltage is lower than the threshold.

In an embodiment of the present invention, the internal power supply module is a capacitor.

In an embodiment of the present invention, when it is determined that the operating voltage is lower than the threshold, an external power supply module is triggered to provide power to the data storage device.

In an embodiment of the present invention, the data storage device further comprises the voltage sensing module coupled to the controller.

In an embodiment of the present invention, the voltage sensing module is coupled to the data storage device.

The data storage device of the present invention adopts the internal power supply module and/or the external power supply module and simultaneously executes the data protection method, the writing times of the data storage device can be effectively reduced, the performance degradation of the data storage device can be avoided, and the service life of the data storage device can be prolonged.

In order to make the above and other objectives, features and advantages of the present invention more obvious and easy to understand, the follow-up examples are given in detail with the accompanying drawings.

DETAILED DESCRIPTION OF PREFERRED EMBODIMENTS

The devices and usage methods of embodiments of the present invention are described below. These embodiments are only used to illustrate the devices and usage methods of the present invention, but are not used to limit the scope of the present invention.

It should be readily understood that the terms "comprise" and "include" used in the specification are used to indicate the existence of specific technical features, numerical values, method steps, operation processes, components and/or components, but the use of the terms does not exclude the addition of any of other technical features, numerical values, method steps, operation processes, components, components or any combination of the above.

The Numerical terms such as "first", "second" and "third" in the claims is used to distinguish the elements, rather than limiting the invention to a specific priority order, a prepositional relationship therebetween, one element being prior to another, or a specific time sequence of executing method steps. These terms are only used to distinguish elements with same/similar names.

It should be understood that when an element is described as "connected" or "coupled" to another element, it can be either directly connected or coupled to said other element, or some intervening elements may be placed therebetween. Conversely, when an element is described as "directly connected" or "directly coupled" to another element, there are no intervening elements. Other terms used to describe the relationship between elements can also be interpreted in a similar way, such as "between" versus "directly between", or "adjacent" versus "directly adjacent", and so on.

Figure 1:
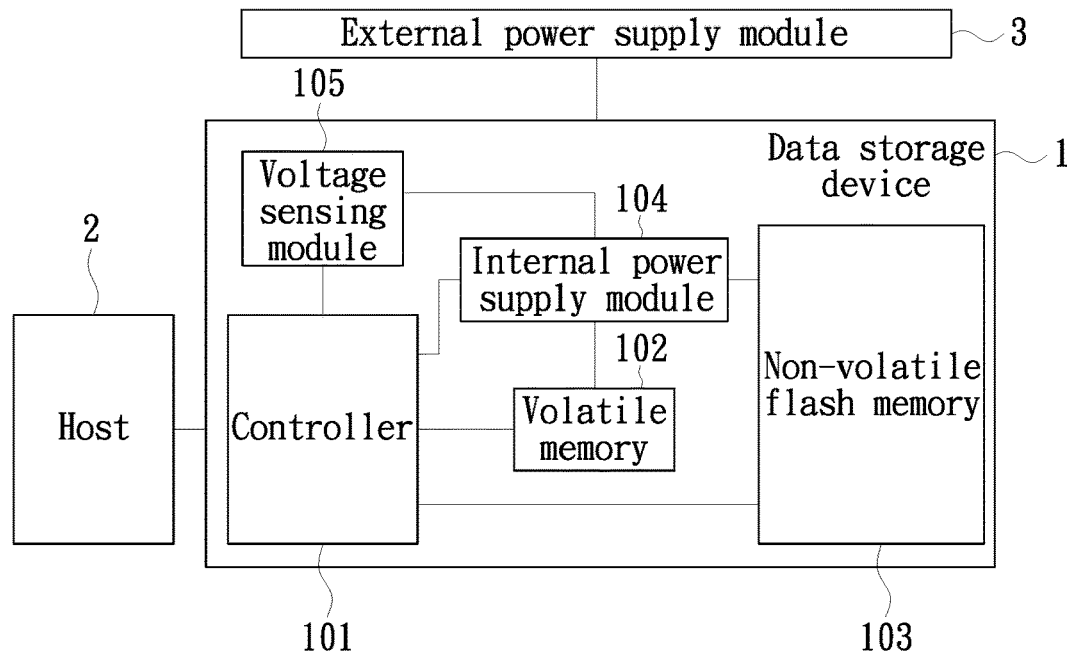
FIG. 1 is a block diagram of a data storage device provided by an embodiment of the present invention.

Referring to FIG. 1, it is a block diagram of a data storage device provided by an embodiment of the present invention. As shown in FIG. 1, the data storage device 1 comprises a controller 101, a volatile memory 102, a non-volatile flash memory 103, an internal power supply module 104 and a voltage sensing module 105, wherein the controller 101 is connected with the volatile memory 102, the non-volatile flash memory 103 and the voltage sensing module 105, and the internal power supply module 104 is connected with the controller 101, the volatile memory 102, the non-volatile flash memory 103 and the voltage sensing module 105. In addition, the data storage device 1 is coupled to the host 2, and the host 2 and the data storage device 1 form a system. The data storage device 1 can not only store the data from the host 2, but also generate and maintain a Host Logical-Flash Physical, (H2F) look-up table to record and store the corresponding relationship between the logical address and the physical address of the data. It should be noted that the volatile memory 102 may temporarily store the data from the host 2 and the recorded H2F look-up table, and the non-volatile flash memory 103 may permanently store the data from the host 2 and the recorded H2F look-up table. In this specification, the data and the H2F look-up table will be collectively referred to as "data". According to one embodiment of the present invention, the data storage device 1 may be a flash memory such as a memory card, a USB flash device, a solid-state hard disk (SSD), an embedded flash memory module (eMMC) that adopts physical interfaces such as the USB, SATA, PATA and PCI, or adopts communication protocols such as USB, NVME, AHCI and SCSI. Furthermore, according to one embodiment of the present invention, the internal power supply module 104 may be a capacitor. According to one embodiment of the present invention, the volatile memory 102 can be placed inside the controller 101. According to one embodiment of the present invention, the voltage sensing module 105 can be placed outside the data storage device 1 and coupled to the data storage device 1. According to one embodiment of the present invention, the controller 101 may execute the writing, erasing and programming of the non-volatile flash memory 103 according to commands of the host 2, and automatically execute the data protection method provided by embodiments of the present invention.

Figure 2:
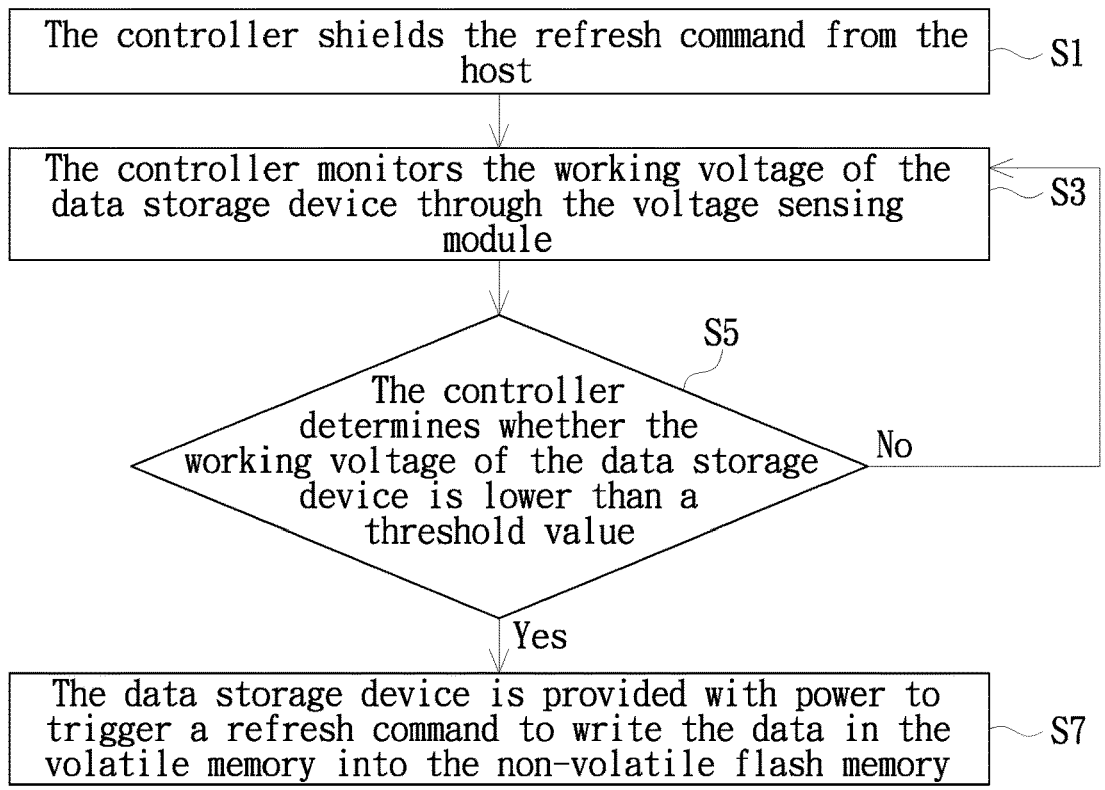
FIG. 2 is a flowchart of a data protection method provided by an embodiment of the present invention.

Referring to FIG. 2, it is a flowchart of a data protection method provided by an embodiment of the present invention. After the data storage device 1 is coupled to the host 2 and powered on, the data protection method provided by the present invention can additionally provide the user with the option whether to execute it or not. To be specific, the data protection method executed by the data storage device 1 is a shielding mode that shields the refresh command and the immediate-standby command, while the conventional data storage device 1 is an unshielded mode that receives and immediately executes the refresh command and the immediate-standby command. When the user opts not to execute the data protection method, the data storage device 1 will frequently receive a refresh command or an immediate-standby command from the host 2 to write the data in the volatile memory 102 into the non-volatile flash memory 103. In addition, as the refresh command is the same as the immediate-standby command, the data in the volatile memory 102 is immediately written into the non-volatile flash memory 103, thus the refresh command and the immediate-standby command are collectively referred to as "refresh command" in the following description.

When the user opts to execute the data protection method, the controller 101 executes a protection program comprising the following steps. Step S1: The controller 101 shields the refresh command from the host 2 to avoid writing the data in the volatile memory 102 into the non-volatile flash memory 103 at any time, so as to reduce the writing times of the data storage device 1, avoid the performance degradation of the data storage device 1, and prolong the service life of the data storage device 1.

Step S3: The controller 101 monitors the working voltage of the data storage device 1 through the voltage sensing module 105 to maintain the normal operation of the data storage device 1.

Step S5: The controller 101 determines whether the working voltage of the data storage device 1 is lower than a threshold value, so as to avoid data loss in the volatile memory 102 when the data storage device 1 is powered off instantaneously. The working voltage may be 1 volt, and the threshold may be 0.8 volt. However, the above examples are merely for illustrative purposes, and those skilled in the art can adjust the working voltage and threshold according to the types of data storage devices.

Step S7: When the controller 101 determines that the working voltage of the data storage device 1 is lower than the threshold, the data storage device 1 is provided with power to trigger a refresh command to write the data in the volatile memory 102 into the non-volatile flash memory 103, so as to prevent the data in the volatile memory 102 from being lost when the data storage device 1 is powered off instantaneously. Specifically, the controller 101 or the voltage sensing module 105 may send a low-voltage signal to the internal power supply module 104 to provide power in real time to maintain the normal operation of the data storage device 1, and the controller 101 executes a refresh command to write the data in the volatile memory 102 into the non-volatile flash memory 103. In addition, when the controller 101 determines that the operating voltage of the data storage device 1 is not lower than the threshold, the flow returns to Step S3.

In addition, as shown in FIG. 1, according to one embodiment of the present invention, the system comprises not only the host 2 and the data storage device 1, but also an external power supply module 3 to maintain the normal operation of the data storage device 1. Specifically, the external power supply module 3 can be an uninterruptible power supply system for supplying emergency power, wherein the external power supply module 3, the controller 101 of the data storage device 1, and the internal or external voltage sensing module 105 cooperate to make the controller 101 or the voltage sensing module 105 send a low-voltage signal to the external power supply module 3 so as to provide power to maintain the normal operation of the data storage device 1, and the controller 101 executes a refresh command to write data in the volatile memory 102 to the non-volatile flash memory 100.

It can be noted that the internal power supply module 104, the voltage sensing module 105, the external power supply module 3, and the Power management IC (PMIC) are the key components for power loss protections. Although the power management IC is not further described or illustrated in the present invention, it can be understood by those skilled in the art that the power management IC is the control core of the system for power supply and power distribution.

In addition, according to one embodiment of the present invention, the system is a server, which comprises a host 2, a plurality of data storage devices 1 provided by the present invention, and a power-off protection device, wherein the power-off protection device comprises a power management integrated circuit, a voltage sensing module 105 and an external power supply module 3, and the plurality of data storage devices 1 are coupled to the host 2 and the power-off protection device. When the controller 101 of each data storage device 1 monitors the working voltage of its data storage device 1 through the internal or external voltage sensing module 105 and determines that the working voltage is lower than the threshold, the internal power supply module 104 and the external power supply module 3 provide power to maintain the normal operation of the data storage device 1, and the controller 101 of each data storage device 1 executes a refresh command to write the data in the volatile memory 102 into the non-volatile flash memory 103.

To sum up, the data storage device and the data protection method provided by the present invention can effectively reduce the writing times of the data storage device, avoid the performance degradation of the data storage device, and prolong the service life of the data storage device by shielding the refresh command from the host and adopting the internal power supply module and the external power supply module.

Although the present invention has been disclosed by examples, it is not intended to limit the scope of the invention. Those skilled in the art are readily to make changes and embellishments without departing from the spirit and scope of the present invention. Therefore, the scope of the present invention should base on what is defined in the appended claims.

What is claimed is:

1. A data protection method applied to a data storage device comprising a volatile memory and a non-volatile flash memory, the data protection method comprising:
    shielding a refresh command from a host;
    monitoring a working voltage of the data storage device through a voltage sensing module;
    determining whether the working voltage is lower than a threshold; and
    providing the data storage device with power to trigger the refresh command when it is determined that the working voltage is lower than the threshold, to write a data in the volatile memory into the non-volatile flash memory.

2. The data protection method according to claim 1, wherein the data storage device comprises an internal power supply module, which is triggered to provide power to the data storage device when it is determined that the working voltage is lower than the threshold.

3. The data protection method according to claim 2, wherein the internal power supply module is a capacitor.

4. The data protection method of claim 1, wherein when it is determined that the working voltage is lower than the threshold, an external power supply module is triggered to provide power to the data storage device.

5. A data storage device comprising:
    a volatile memory;
    a non-volatile flash memory;
    an internal power supply module being coupled to the volatile memory and the non-volatile flash memory; and
    a controller, coupled to the volatile memory, the non-volatile flash memory and the internal power supply module, the controller being capable of
    shielding a refresh command from a host;
    monitoring a working voltage of the data storage device through a voltage sensing module;
    determining whether the working voltage is lower than a threshold; and
    providing the data storage device with power when it is determined that the working voltage is lower than the threshold, in order to trigger the refresh command to write a data in the volatile memory into the non-volatile flash memory.

6. The data storage device according to claim 5, wherein the internal power supply module is triggered to provide power to the data storage device when it is determined that an operating voltage is lower than the threshold.

7. The data storage device of claim 6, wherein the internal power supply module is a capacitor.

8. The data storage device of claim 5, wherein when it is determined that an operating voltage is lower than the threshold, an external power supply module is triggered to provide power to the data storage device.

9. The data storage device according to claim 5, further comprising the voltage sensing module coupled to the controller.

10. The data storage device of claim 5, wherein the voltage sensing module is coupled to the data storage device.

* * * * *